United States Patent [19]

Bäbler

[11] Patent Number: 5,030,734
[45] Date of Patent: Jul. 9, 1991

[54] SOLID SOLUTIONS OF AZOMETHINE PIGMENTS

[75] Inventor: Fridolin Bäbler, Marly, Switzerland

[73] Assignee: Ciba-Geigy Corporation, Ardsley, N.Y.

[21] Appl. No.: 258,541

[22] Filed: Oct. 17, 1988

[30] Foreign Application Priority Data

Oct. 28, 1987 [CH] Switzerland .................. 4220/87

[51] Int. Cl.⁵ ..................... C07D 2/09; C04B 14/00
[52] U.S. Cl. ........................... 548/460; 106/494;
  106/496; 106/498; 106/506; 106/23
[58] Field of Search ............. 548/460, 453; 106/494,
  106/493, 496, 498, 22, 23, 499, 506; 524/94;
  546/271

[56] References Cited

U.S. PATENT DOCUMENTS 4,008,097  2/1977  Bitterli et al. ............... 106/288 Q
4,783,540  11/1988  Bäbler ......................... 548/453

Primary Examiner—Josephine Barr
Attorney, Agent, or Firm—Luther A. R. Hall

[57] ABSTRACT

Solid solutions consisting of at least two different compounds of the formula I

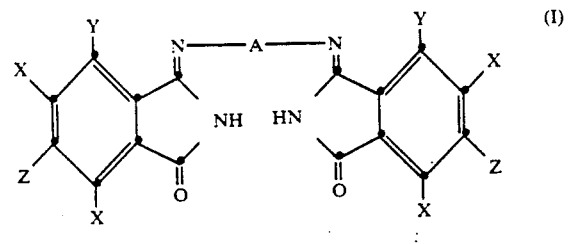

in which A is one of the groups

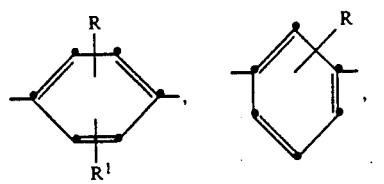

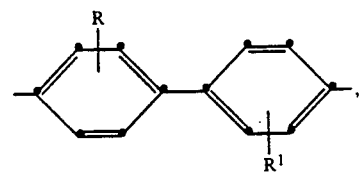

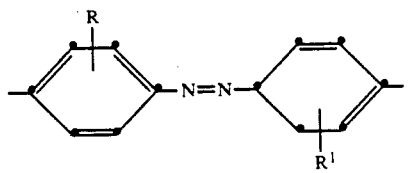

or

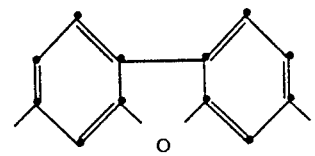

in which R and $R^1$ independently of one another are hydrogen, halogen, $C_1$–$C_4$alkyl or $C_1$–$C_4$alkoxy, X is halogen, Y and Z independently of one another are halogen, $C_1$–$C_4$alkoxy, $C_1$–$C_4$alkylmercapto, $C_5$–$C_6$cycloalkoxy, phenoxy which is unsubstituted or substituted by halogen or $C_1$–$C_4$alkyl, wherein the compounds of the formula I which form the solid solutions differ in at least one of the substituents X, Y or Z and/or in the group A and the X-ray diffraction patterns of the solid solutions differ from the sum of the X-ray diffraction patterns of the individual components.

This type of solid solution is highly suitable for use as pigments for the dyeing of high-molecular-weight organic material.

4 Claims, No Drawings

SOLID SOLUTIONS OF AZOMETHINE PIGMENTS

The present invention relates to solid solutions of isoindolinone compounds substituted on the benzene ring and use thereof for the dyeing of high-molecular-weight organic materials.

U.S. Pat. No. 4,008,097 discloses mixtures of isoindolinone pigments obtained by mixed synthesis from isoindolinones which are unsubstituted on the benzene ring and substituted p-phenylenediamines. Although in general these mixtures have good pigment properties, they do not always meet today's high requirements of industry.

It has now been found that solid solutions being distinguished by very good pigment properties can surprisingly be obtained from two different isoindolinone compounds substituted on the benzene ring.

Accordingly, the present invention relates to solid solutions consisting of at least two different compounds of the formula I

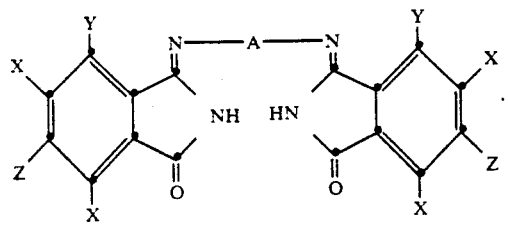

in which A is one of the groups

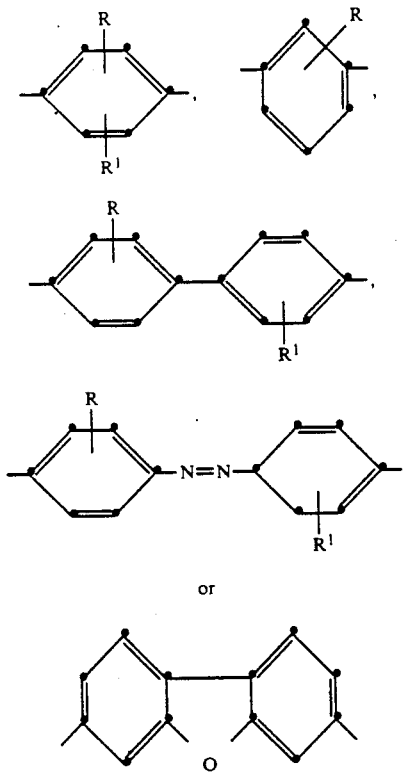

in which R and R¹ independently of one another are hydrogen, halogen, $C_1$–$C_4$alkyl or $C_1$–$C_4$alkoxy, X is halogen, Y and Z independently of one another are halogen, $C_1$–$C_4$alkoxy, $C_1$–$C_4$alkylmercapto, $C_5$–$C_6$cycloalkoxy, phenoxy which is unsubstituted or substituted by halogen or $C_1$–$C_4$alkyl, wherein the compounds of the formula I which form the solid solutions differ in at least one of the substituents X, Y or Z and/or in the group A and the X-ray diffraction patterns of the solid solutions differ from the sum of the X-ray diffraction patterns of the individual components.

Any halogen substituents can be for example fluorine, bromine, iodine or, in particular, chlorine.

Any $C_1$–$C_4$alkyl substituents can be for example methyl, ethyl, n-propyl, isopropyl, n-butyl, sec-butyl, tert-butyl.

Any $C_1$–$C_4$alkoxy substituents can be for example methoxy, ethoxy, n-propoxy, isopropoxy, n-butoxy, sec-butoxy or tert-butoxy.

Y and Z as $C_1$–$C_4$alkylmercapto are for example methylmercapto, ethylmercapto, n-propylmercapto, isopropylmercapto, n-butylmercapto, sec-butylmercapto, tert-butylmercapto.

Y and Z as $C_5$–$C_6$cycloalkoxy are for example cyclopentyloxy or preferably cyclohexyloxy.

A is preferably one of the groups

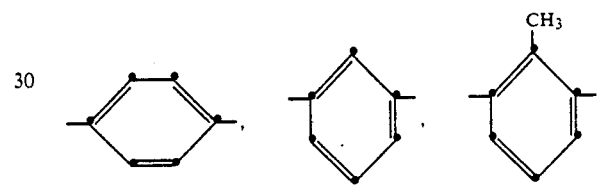

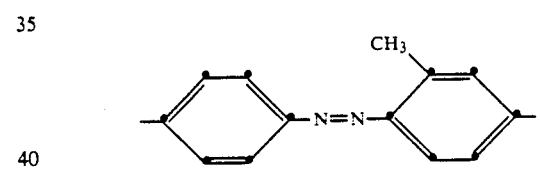

or

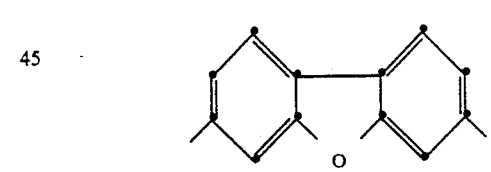

Particularly preferably A is one of the groups

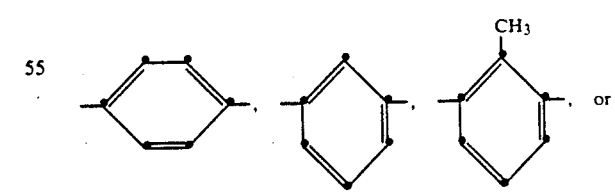

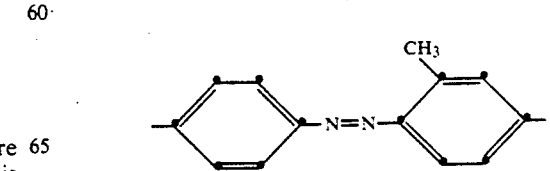

and in particular

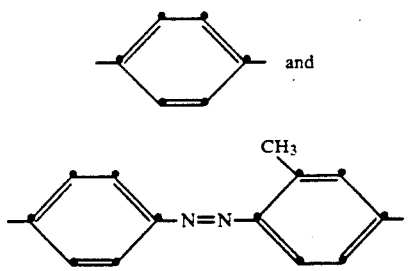

X is preferably chlorine and Y and Z are preferably $C_1-C_4$alkoxy and in particular chlorine.

In the solid solutions according to the invention, the ratio of the two compounds of the formula I essentially forming the solid solution is advantageously 5–95:95–5, preferably 10–90:90–10, % by weight.

The solid solutions according to the invention can be prepared, starting from physical mixtures of the individual components (two different compounds of the formula I) by the following processes known per se:

by contacting the component mixture in polar organic solvents, preferably by stirring it at the reflux temperature;

by dissolution of the component mixture in polar organic solvents and reprecipitation with alkali or by stirring or milling it in polar organic solvents in the presence of bases such as alcoholates, alkali metal hydroxides or quaternary ammonium compounds;

by intensive milling or kneading of the component mixture, if necessary followed by recrystallization in water and/or organic solvents.

The polar organic solvents in whose presence the individual components are brought into contact to form the solid solutions according to the invention can be for example dimethylformamide, N-methylformamide, tetramethylurea, dimethyl acetamide, N-methylpyrrolidone, dimethyl sulfoxide, tetramethyl sulfone, glacial acetic acid, ketones such as cyclohexanone, alcohols such as n-butanol, cyclohexanol or benzyl alcohol, furthermore ethylene glycol, propylene glycol, ethers such as ethylene glycol dimethyl ether, diphenyl ether or anisole, and also aromatic hydrocarbons such as nitrobenzene, chlorobenzene, dichloro- and trichlorobenzenes, toluenes and xylenes or esters such as ethyl acetate or butyl acetate.

The physical mixture of the individual components is dissolved and reprecipitated with alkali by dissolving it in a polar organic solvent, preferably an alcohol of the formula $C_rH_{2r+1}OH$, in which r is a whole number from 1 to 5, with the addition of at least an equivalent amount of a base, for example a sodium alcoholate, for example sodium methylate, sodium ethylate, sodium isopropylate or sodium tert-amylate, ammonia, methylamine or dimethylamine, sodium hydroxide solution or potassium hydroxide solution, after which the solid solution is precipitated by dilution with water or by addition of a mineral acid or organic acid such as hydrochloric acid, sulfuric acid or acetic acid.

Preferably, the solid solutions according to the invention are prepared, starting from the physical component mixtures, by milling or kneading, for example kneading of the salt in the presence of an organic solvent such as diacetone alcohol.

A particularly preferred milling process is milling in an organic solvent and/or water. The milling materials can be metal balls or in particular glass balls or ceramic balls, plastic granules or sand grains, as are generally customary for pigments. Dry milling and dry-salt milling are also suitable as milling processes.

The millings and kneadings are advantageously carried out at temperatures between 5 and 90° C., preferably between 15 and 60° C.

In dry-salt milling, NaCl, $CaCl_2$, $Na_2SO_4$ or $Al_2(SO_4)_3$ are preferably used anhydrous or as hydrates. For example, 10 to 50 parts by weight of the component mixture are used per 100 to 150 parts by weight of salt. It may be advantageous to add small amounts of solvents such as xylene or tetrachloroethylene and/or surfactants, for example sodium dodecylbenzenesulfonate or isopropylammonium dodecylbenzenesulfonate, to the milling medium. The workshop is carried out by methods known per se by separating the solution/salt mixture from the milling materials, then pouring it into water and then filtering off the resulting suspension.

Aqueous millings of the physical component mixtures can be carried out with or without milling auxiliaries, such as have been described, for example, in EP-A-101,666 and also in EP-A-221,853. It may be advantageous to shift the pH from the neutral to the weekly acidic or alkaline range.

Although the solid solutions according to the invention have very good pigment properties, it may be advantageous to add texture-protecting agents.

Examples of suitable texture-protecting agents are fatty acids having at least 12C atoms such as stearic acid or behenic acid, amides, esters or salts thereof such as magnesium stearate, zinc stearate or aluminium stearate or magnesium behenate, furthermore quaternary ammonium compounds such as tri($C_1-C_4$)alkylbenzylammonium salts, furthermore softeners such as epoxidized soya oil, waxes such as polyethylene wax, resin acids such as abietinic acid, rosin, hydrogenated or dimerized rosin, $C_{12}-C_{18}$paraffin-disulfonic acids, alkyl phenols or alcohols such as stearyl alcohol, furthermore laurylamine or stearylamine and also aliphatic 1,2-diols such as dodecane-1,2-diol.

Preferred texture-protecting agents are laurylamine or stearylamine, aliphatic 1,2-diols, stearic acid, amides, salts or esters thereof, epoxidized soya oil, waxes or resin acids.

These additives can be added in amounts of 0.05 to 20, preferably 1 to 10% by weight, relative to the solid pigment solution, before, during or after its formation.

Solid solutions can be characterized by their X-ray diffraction spectrum, which differs from that of the physical mixture of the two individual components. The X-ray diffraction pattern of the solid solutions according to the invention is distinguished by other lines than the sum of the X-ray diffraction patterns of the individual components.

The solid solutions according to the invention have interesting greenish to reddish yellow hues and produce colourings of very high resistance to light, weather, heat and migration. Compared with the corresponding physical mixtures, they additionally often have surprising shifts in hues.

The solid solutions according to the invention are highly suitable for use as pigments for the dyeing of high-molecular-weight organic material.

Compared with the starting pigments, they have different colouristic properties and, depending on the preparation process, can be present in transparent or hiding form. By thermal aftertreatment in organic solvents, they can be, for example, readily recrystallized, i.e., a hiding form having a uniform pigment particle size and shape is obtained. Preferably, the organic solvents used are benzene substituted, for example, by halogen atoms, alkyl or nitro groups, such as xylenes, chlorobenzene, o-dichlorobenzene or nitrobenzene, and also pyridine based such as pyridine, picoline or quinoline, furthermore ketones such as cyclohexanone, alcohols such as isopropanol, butanols, pentanols or tricyclodecane alcohols, ethers such as ethylene glycol monomethyl ether or ethylene glycol monoethyl ether, amides such as dimethylformamide or N-methylpyrrolidone, and also dimethyl sulfoxide or sulfolane.

High-molecular-weight organic materials which can be coloured or pigmented with the solid solutions according to the invention are for example cellulose ethers and esters, such as ethyl cellulose, nitrocellulose, cellulose acetate or cellulose butyrate, natural resins or synthetic resins, such as polymerization resions or condensation resins, such as amino resins, in particular urea and melamine formaldehyde resins, alkyd resins, phenolic resins, polycarbonates, polyolefins, polystyrene, polyvinyl chloride, polyamides, polyurethanes, polyesters, ABS, polyphenylene oxides, rubber, casein, silicone and silicone resins, individually or in mixtures.

The solid solutions according to the invention are particularly suitable for colouring polyvinyl chloride and polyolefins such as polyethylene and polypropylene, and also for pigmenting coatings and paints, in particular automobile top coats.

The high-molecular-weight organic compounds mentioned can be present individually or in mixtures as plastic compositions, melts or in the form of spinnable solutions, coatings, paints or printing inks. Depending on the intended use, it has proven advantageous to use the solid solutions according to the invention as toners or in the form of formulations.

Based on the high-molecular-weight organic material to be pigmented, the solid solutions according to the invention can be used in an amount of 0.01 to 30% by weight, preferably 0.1 to 10% by weight.

The pigmenting of the high-molecular-weight organic substances with the solid solutions according to the invention is effected for example by mixing such a solid solution, if desired in the form of a master-batch, into these substrates using roll mills or mixing or milling apparatus. The pigmented material is then brought into the desired final form by methods known per se, such as calendering, pressing, extruding, coating, casting or injection moulding. Frequently it is desirable, if the mouldings to be produced are not to be rigid or to reduce their brittleness, to incorporate plasticizers in the high-molecular-weight compounds before moulding. These plasticizers can be for example esters of phosphoric acid, phthalic acid or sebacic acid. They can be incorporated into the polymers before or after incorporation of the solid solutions according to the invention. It is also possible, if different hues are to be obtained, to add to the high-molecular-weight organic materials not only the solid solutions according to the invention but also fillers and other colouring constituents, such as white, coloured or black pigments in any desired amount.

For pigmenting of coatings, paints and printing inks, the high-molecular-weight organic materials and the solid solutions according to the invention, if desired together with additives, such as fillers, other pitments, siccatives or plasticizers, are finely dispersed or dissolved in a common organic solvent or a solvent mixture. This can be done by dispersing or dissolving the individual components by themselves or, alternatively, several of them together, and only then combining all the components.

In colourings, for example of polyvinyl chloride or polyolefins, the solid solutions according to the invention are distinguished by good general pigment properties, such as good dispersibility, high colour strength and purity, good resistance to migration, heat, light and weather.

The Examples which follow illustrate the invention.

EXAMPLE 1

In a ball mill of about 1 liter capacity containing as milling auxiliary 1.5 kg of steel balls (1.2 cm in diameter) and 150 g of nails (3 cm in length), 4.4 g of the pigment of the formula II

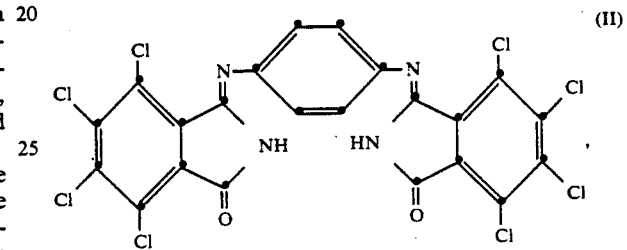

0.8 g of the pigment of the formula (III)

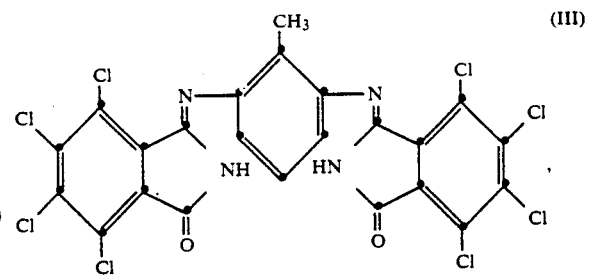

20 g of aluminium sulfate [Al$_2$(SO$_4$)$_3$x15–18H$_2$O], 0.25 g of sodium dodecylbenzenesulfonate and 0.8 ml of tetrachloroethylene are added. The tightly sealed mill is rolled on a roller at room temperature for 6 hours. The milling medium is then separated off from the milling material and stirred in 500 ml of water at 60–70° C. for 1 hour. The pigment is filtered off, the press cake is washed with hot water until neutral and free from salt, dried at 80° C. in a vacuum drying cabinet, and the resulting material is powdered. This gives 5.0 g of a very finely crystalline yellow solid pigment solution whose X-ray diffraction pattern differs from the X-ray diffraction pattern of the physical mixture of the corresponding starting materials.

Upon incorporation into plastics and coatings, strong yellow colourings having very good resistances are obtained.

3.5 g of the finely crystalline solid pigment solution obtained by the above process are stirred in 80 ml of n-butanol at the reflux temperature for 16 hours. The yellow pigment suspension is cooled, filtered off, and the solid is washed with n-butanol. The pressed material is dried at 80° C. in a vacuum drying cabinet, and the resulting material is powdered. This gives a solid pigment solution having coarser crystals than the starting material and whose X-ray diffraction pattern still differs from the X-ray diffraction pattern of the physical mixture of the corresponding starting components. This means that during the solvent treatment an increase in crystal size but not a separation into the individual starting components takes place. The electron-microscopic picture of the crystals obtained shows particles having a uniform prism-like structure.

EXAMPLE 2

The procedure described in Example 1 is repeated, except that instead of the pigment of the formula III the pigment of the formula IV

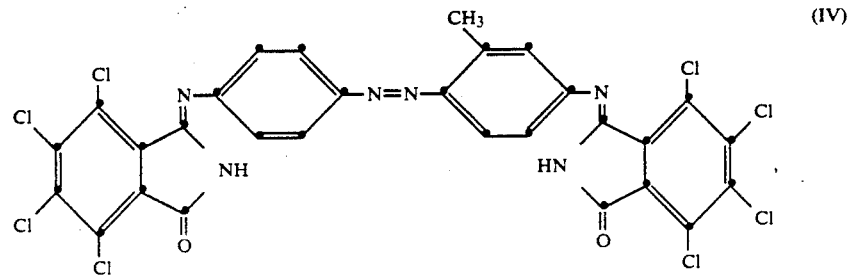
(IV)

is used to give a reddish yellow solid pigment solution whose X-ray diffraction pattern differs from the X-ray diffraction pattern of the physical mixture of the corresponding starting materials. Upon incorporation into plastics and coatings, strong reddish yellow colourings having very good resistances are obtained.

EXAMPLE 3

The procedure described in Example 1 is repeated, except that instead of 4.4 g only 4.1 g of the pigment of the formula II and instead of 0.8 g of the pigment of the formula III 1.0 g of the pigment of the formula V

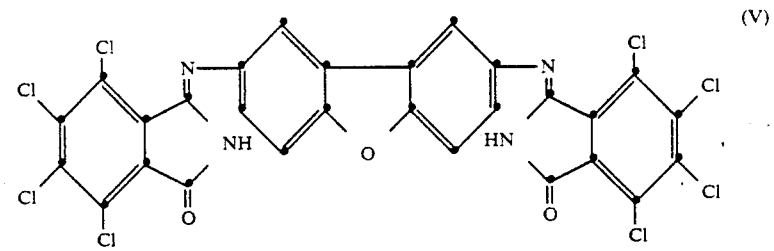
(V)

are used to give a yellow finely crystalline solid pigment solution whose X-ray diffraction pattern differs from the X-ray diffraction pattern of the physical mixture of the corresponding starting materials.

The finely crystalline solid solution obtained as described in Example 1 is recrystallized, as a result of which it is obtained in a somewhat coarser crystalline pigment form, which can be incorporated in coatings and plastics with no difficulties and produces strong yellow colourings having very good resistances.

EXAMPLE 4

The procedure described in Example 3 is repeated, except that instead of the pigment of the formula II the pigment of the formula III is used to give a solid pigment solution whose X-ray diffraction pattern differs from the X-ray diffraction pattern of the physical mixture of the corresponding starting materials and which upon incorporation in plastics and coatings produces greenish yellow colourings having a high colour strength and very good resistances.

EXAMPLE 5

The procedure described in Example 3 is repeated, except that instead of 1.0 g, 4.1 g of the pigment of the formula V and instead of 4.4 g of the pigment of the formula II, 1.0 g of the pigment of the formula II are used to give a solid pigment solution whose X-ray diffraction pattern differs from the X-ray diffraction pattern of the physical mixture of the corresponding starting materials and which, upon incorporation in plastics and coatings, produces greenish yellow colourings having a high colour strength and purity and very good resistances.

EXAMPLE 6

16 g of the pigment of the formula II, 64 g of the pigment of the formula III, 4.2 g of 8-hydroxymethyl-tricyclo[5.2.1.0$^{2,6}$]decane [®TCD alcohol M, from HOECHST] and 630 ml of water are thoroughly stirred in a beaker at room temperature for one hour. In a ®DYNO mill, KDL type (from W. A. Backofen, Basle), equipped with a steel milling container holding 600 ml and containing 480-510 ml of glass balls having a diameter of about 1 mm, the pigment suspension obtained is milled at a stirrer speed of 3,000 rpm and a pump delivery of 400 ml/min intensively at 20-25° C. for one hour and 45 minutes. The mill is then washed by passing through 1 l of water and the combined suspensions are filtered. The press cake is washed with water, dried at 80° C. in a vacuum drying cabinet, and the dried material is powdered. This gives a very finely crystalline yellow solid pigment solution whose X-ray diffraction pattern differs from the X-ray diffraction pattern of the physical mixture of the corresponding starting materials. Upon incorporation into plastics, highly transparent yellow colourings having very good resistances are obtained.

32 g of the very finely crystalline pigment solution obtained by the above process are stirred in 500 ml of o-dichlorobenzene at 140-145° C. for 18 hours. The yellow pigment suspension is cooled, filtered off, and the solid product is washed with methanol. The pressed material is dried at 80° C. in a vacuum drying cabinet, and the material obtained is powdered. This gives a coarser crystalline solid pigment solution whose X-ray diffraction pattern still differs from the X-ray diffraction pattern of the physical mixture of the corresponding starting components. This means that during the solvent treatment an increase in particle size but no separation into the individual starting components takes place. The electron-microscopic picture of the crystals obtained shows particles having a uniform prism-like structure. Upon incorporation in plastics and coatings, strong, pure, yellow colourings having very good resistances are obtained.

EXAMPLE 7

150 ml of tert-amyl alcohol are initially introduced into a 350 ml glass vessel, and nitrogen is slowly passed in. 1.1 g of sodium and then as emulsifier 0.2 g of the sodium salt of bis(2-ethylhexyl) sulfosuccinate are added to tert-amyl alcohol, and the mixture is slowly heated to 95-102° C. With vigorous stirring, the molten metal is dissolved in the alcohol. The resulting solution is cooled to about 80° C., and 12.8 g of pigment of the formula II and also 3.2 g of pigment of the formula IV are added. The mixture is heated to 100° C. and stirred at this temperature for 90 minutes. The reaction mixture thus obtained is poured into 300 ml of water is a 1.5 l glass vessel with stirring, and the tertamyl alcohol is then distilled off. The pigment suspension obtained is filtered off, the press cake is washed with water, dried at 80° C. in a vacuum drying cabinet and powdered. This gives a reddish yellow solid pigment solution whose X-ray diffraction pattern differs from the X-ray diffraction pattern of the physical mixture of the corresponding starting materials, but has a similar pattern to that of the solid pigment solution obtained by Example 2. Upon incorporation into plastics and coatings, very strong, reddish yellow colourings having very good resistances are obtained.

EXAMPLE 8

16 g of the pigment of the formula VI

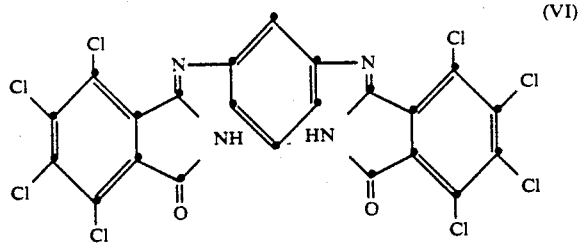

(VI)

64 g of the pigment of the formula III, 4.2 g of 8-hydroxymethyl-tricyclo [5.2.1.0$^{2,6}$]decane ®TCD alcohol M, from HOECHST) and 630 ml of water are thoroughly stirred in a beaker for one hour at room temperature. In a ®DYNO mill, KDL type (from W. A. Bachofen, Basle), the pigment suspension is milled as described in Example 6. 100 ml of n-butanol are added to the pigment suspension thus obtained, and the mixture is stirred at the reflux temperature for 3.5 hours. The pigment suspension is filtered off, the press cake is washed with water, dried at 80° C. in a vacuum drying cabinet and powdered. This gives a yellow solid pigment solution whose X-ray diffraction pattern differs from the X-ray diffraction pattern of the physical mixture of the corresponding starting materials. Upon incorporation into coatings, transparent greenish yellow colourings having very good resistances are obtained.

EXAMPLE 9

40 mg of the solid solution obtained according to Example 1 are thoroughly mixed with 7.3 ml of dioctyl phthalate and 13.3 g of a stabilized polyvinyl chloride, ®LONZA E 722 type, in a beaker using a glass rod. The mixture is processed on a roll mill at 160° C. for 5 minutes to give a thin film. The PVC film thus produced has a very strong yellow colouring which is resistant to migration and light.

EXAMPLE 10

A mixture of
130 g of steatite balls (8 mm in diameter)
47.5 g of a heat-curing acrylic coating consisting of
41.3 g of acrylic resin ®VIACRYL VC 373, 60% (from VIANOVA Kunstharz AG),
16.3 g of melamine resin ®MAPRENAL TTX, 55% (from HOECHST AG),
32.8 g of xylene,
4.6 g of ethylene glycol monoethyl ether acetate,
2.0 g of butyl acetate and
1.0 g of ®Silicone oil A, 1% in xylene (from BAYER AG) and 2.5 g of the solid solution obtained according to Example 4
is dispersed in a 200 ml glass bottle having a twist-off cap on a roller for 72 hours. After the steatite balls have been separated off,
8.0 g of the full shade mixture thus dispersed,
0.6 g of aluminium paste ®ALCOA (Al content 60-65%, from Aluminum Corporation of America)
1.0 g of methyl ethyl ketone and
18.4 g of the above heat-curing acrylic coating
are thoroughly mixed, sprayed onto aluminium sheets and then baked at 130° C. for 30 minutes.

This gives very strong greenish yellow metal effect coatings having very good resistances.

A different solid solution according to one of the other examples is used instead of the solid solution according to Example 4 to give likewise high grade colourings.

EXAMPLE 11

A mixture of 130 g of steatite balls, 8 mm in diameter, 47.5 g of alkyd melamine stoving enamel consisting of 60 g of short-oil alkyd resin ®BECKOSOL 27-320 (from Reichhold Chemie AG) 60% in xylene, 36 g of melamine resin ®SUPER-BECKAMIN 13-501 (from Reichhold Chemie AG) 50% in xylene:butanol (2:1 mixture), 2 g of xylene and 2 g of ethylene glycol monomethyl ether and 2.5 g of the solid solution obtained according to Example 1 is dispersed in a 200 ml glass bottle having a twist-off cap on a roller for 120 hours. After the steatite balls have been separated off, 2.4 g of the full shade mixture thus dispersed are mixed with 6.0 g of titanium dioxide ®KRONOS RN 59 (from Kronos Titan GmbH) and a further 24.0 g of the above alkyd melamine stoving enamel. The resulting mixture is sprayed onto aluminium sheets and subsequently baked a 130° C. for 30 minutes. This gives yellow colourings having very good resistances.

EXAMPLE 12

A mixture consisting of 1.0 g of the solid pigment solution obtained according to Example 2, 1.0 g of antioxidant (®IRGANOX 1010, from CIBA-GEIGY AG) and 1,000 g of polyethylene HD granules (®VESTOLEN A 60-16, from HUELS) is premixed in a glass bottle on a roller for 15 minutes. The mixture is then extruded in two passages on a single-roll extruder, the granules thus obtained are moulded to sheets at 220° C. on an injection-moulding machine (Allround Aarburg 200) and pressed afterwards at 180° C. for 5 minutes. The pressed sheets have strong reddish yellow hues having very good resistances.

EXAMPLE 13

1,000 g of polypropylene granules (®DAPLEN PT-55, from Chemie LINZ) and 20 g of a 50% pigment formulation consisting of 10 g of the solid pigment solution obtained according to Example 4 and 10 g of Mg behenate are intensively mixed in a mixing drum. The granules thus treated are spun at 260 to 285° C. by the melt spinning process. This gives greenish yellow fibres having very good light and textile fastness properties.

What is claimed is:

1. A solid solution consisting of at least two different compounds of formula I

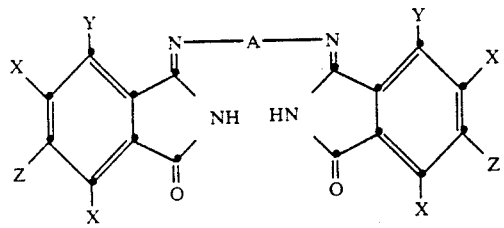

in which A is one of the groups

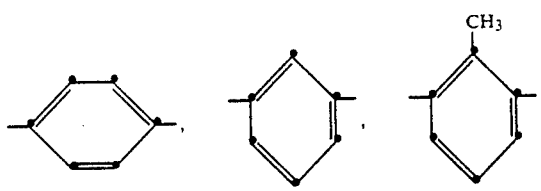

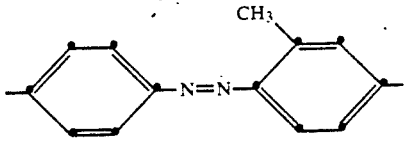

or

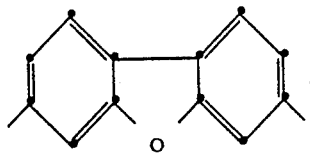

X is halogen, Y and Z independently of one another are halogen, $C_1$-$C_4$alkoxy, $C_1$-$C_4$alkylmercapto, $C_5$-$C_6$cycloalkoxy, phenoxy which is unsubstituted or substituted by halogen or $C_1$-$C_4$alkyl, wherein the compounds of the formula I which form the solid solutions differ in at least one of the substituents X, Y or Z or in the group A and the X-ray diffraction patterns of the solid solutions differ from the sum of the X-ray diffraction patterns of the individual components.

2. A solid solution according to claim 1 consisting of at least two different compounds of the formula I, in which A is one of the groups

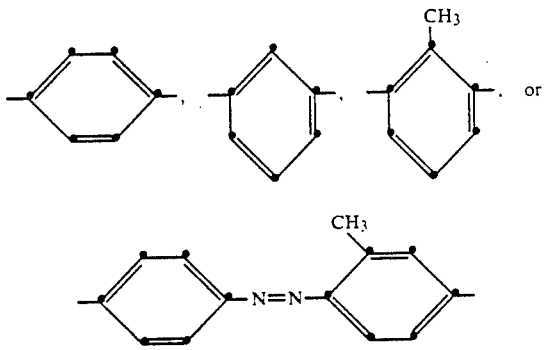

3. A solid solution according to claim 1 consisting of at least two different compounds of the formula I, in which X is chlorine, Y and Z independently of one another are chlorine or $C_1$-$C_4$alkoxy.

4. A solid solution according to claim 1 consisting of at least two different compounds of the formula I, in which X, Y and Z are chlorine.

* * * * *